United States Patent [19]
Buck-Gengler

[11] Patent Number: 5,777,628
[45] Date of Patent: Jul. 7, 1998

[54] METHOD AND APPARATUS FOR DETECTING CACHE COLLISIONS IN A TWO DIMENSIONAL MEMORY

[75] Inventor: Joel Buck-Gengler, Longmont, Colo.

[73] Assignee: Hewlett-Packard Company, Palo Alto, Calif.

[21] Appl. No.: 655,054

[22] Filed: May 29, 1996

[51] Int. Cl.$^6$ .................................................. G06F 15/00
[52] U.S. Cl. ................................................................. 345/474
[58] Field of Search ........................... 345/526, 509, 345/515, 523, 473, 474, 475

[56] References Cited

U.S. PATENT DOCUMENTS 4,924,388  5/1990  Stansfield et al. ............... 345/474
5,287,446  2/1994  Williams et al. ................. 395/152
5,513,307  4/1996  Naka et al. ....................... 345/474

*Primary Examiner*—Phu K. Nguyen

[57] ABSTRACT

A collision detection method and apparatus that detects the likelihood of a collision with an address of data previously retrieved from a two dimensional memory array, such as a memory array suitable for use as the frame buffer memory within a graphics display sub-system of a computer system. The collision detection system can also view the memory as having only one dimension to detect the likelihood of a collision with higher or lower accesses relative to a current access.

21 Claims, 6 Drawing Sheets

METHOD AND APPARATUS FOR DETECTING CACHE COLLISIONS IN A TWO DIMENSIONAL MEMORY

FIELD OF THE INVENTION

This invention relates to computer systems and more particularly to graphics display devices within such computer systems. Even more particularly, the invention relates to a graphics controller that detects possible cache collisions when accessing a frame buffer within the graphics controller.

BACKGROUND OF THE INVENTION

Graphics controller cards have become increasingly sophisticated and are often capable of performing complex operations from a single command. These complex operations often necessitate the modification, by specified rules, of the existing contents of a frame buffer memory used to display data on a display device. The nature of these complex operations often require that multiple accesses to the frame buffer memory, in particular multiple accesses to the same location within the frame buffer memory, be done in such a manner that they take place in the same order as originally specified. There is a turnaround time associated with the frame buffer memory, such that a read followed by a write takes longer to perform than two successive reads or two successive writes would take to perform. Thus, to achieve the highest performance when modifying the frame buffer memory, controllers often queue up as many operations as possible, then issue a burst of read operations to retrieve data from the frame buffer memory, perform the modification on the data read, and then issue a burst of write operations to write the new data back to the frame buffer memory.

To match the requirements of the complex operation with the desire for higher performance, the controller must be able to detect whether a given memory access "collides" with a previous access. That is, whether data from the previous access, at the same memory address as the current access, is already being held in the queue. If such a collision is detected, the controller must either flush the queue before performing the new memory access, or the controller must somehow tag the new access to cause it to use the result from the modification made on the data from the older access. Either of these options requires a mechanism for detecting the collision, that is, the presence of data in the queue from an earlier memory access, wherein the earlier memory access was to the same memory address as the current access.

The typical method for detecting a collision of memory addresses is to use an associative memory, sometimes called a content addressable memory. In an associative memory, the address of each access is stored along with the data, as well as a "tag" bit indicating validity. When a new memory access is to be performed, the address of the new memory access is compared, in parallel by the associative memory, to the addresses of all the valid entries presently contained in the associative memory. This same mechanism is used in conventional cache systems within processors, as well as virtual memory systems. While the associative memory method works very well, it requires very costly hardware to perform the parallel comparisons.

There is need in the art then for a method or apparatus to detect possible cache collisions when reading data from a memory. There is a further need in the art for such a collision detection method or apparatus that avoids the costly parallel comparisons used in associative memories. The present invention meets these and other needs in the art.

SUMMARY OF THE INVENTION

It is an aspect of the invention to detect possible cache collisions when reading data from a memory.

It is another aspect of the invention to detect such collisions when performing operations with graphical objects.

The above and other aspects of the invention are accomplished in a method and apparatus which detects the likelihood of a collision within a two dimensional memory array, for example a memory array that is used as the frame buffer memory within a graphics display sub-system of a computer system. In the method and apparatus of the present invention, the address of the most recent access to the memory, or the first access after flushing a cache buffer, is retained by the system. Thereafter, the collision detection system is concerned only with the relative position of subsequent frame buffer memory accesses. The system tracks the relative position of all the previous frame buffer memory accesses, and flags a potential collision, or "hit", when the stream of memory accesses turns back upon itself in such a manner that a collision might be possible.

To accomplish this, the system maintains the X and Y locations of the address of the last frame buffer memory access, as well as nine state bits to indicate whether memory accesses have occurred above or below the address of the last memory access, to the left or to the right of the last memory access, or at any of the four diagonal locations, above-left, below-left, above-right, and below-right, from the last memory access. The system then compares the address of the current memory access, both its X and Y components, to the last memory access address X and Y components, to determine the direction of the current memory access relative to the last memory access. After determining the direction, the system then compares this direction to one of the nine state bits and if the state bits indicate that there has already been a memory access in that direction, the system identifies a potential hit.

After each memory access, the system updates the nine state bits to indicate the address locations of all accesses since the last time the state bits were reset.

In an alternative embodiment, the system views the memory as having only one dimension and tracks higher and lower accesses relative to the current access.

The invention also includes a method that retains the relative position of all the previous frame buffer memory accesses, and flags a potential collision, or "hit", when the stream of memory accesses turns back upon itself in such a manner that a collision might be possible.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
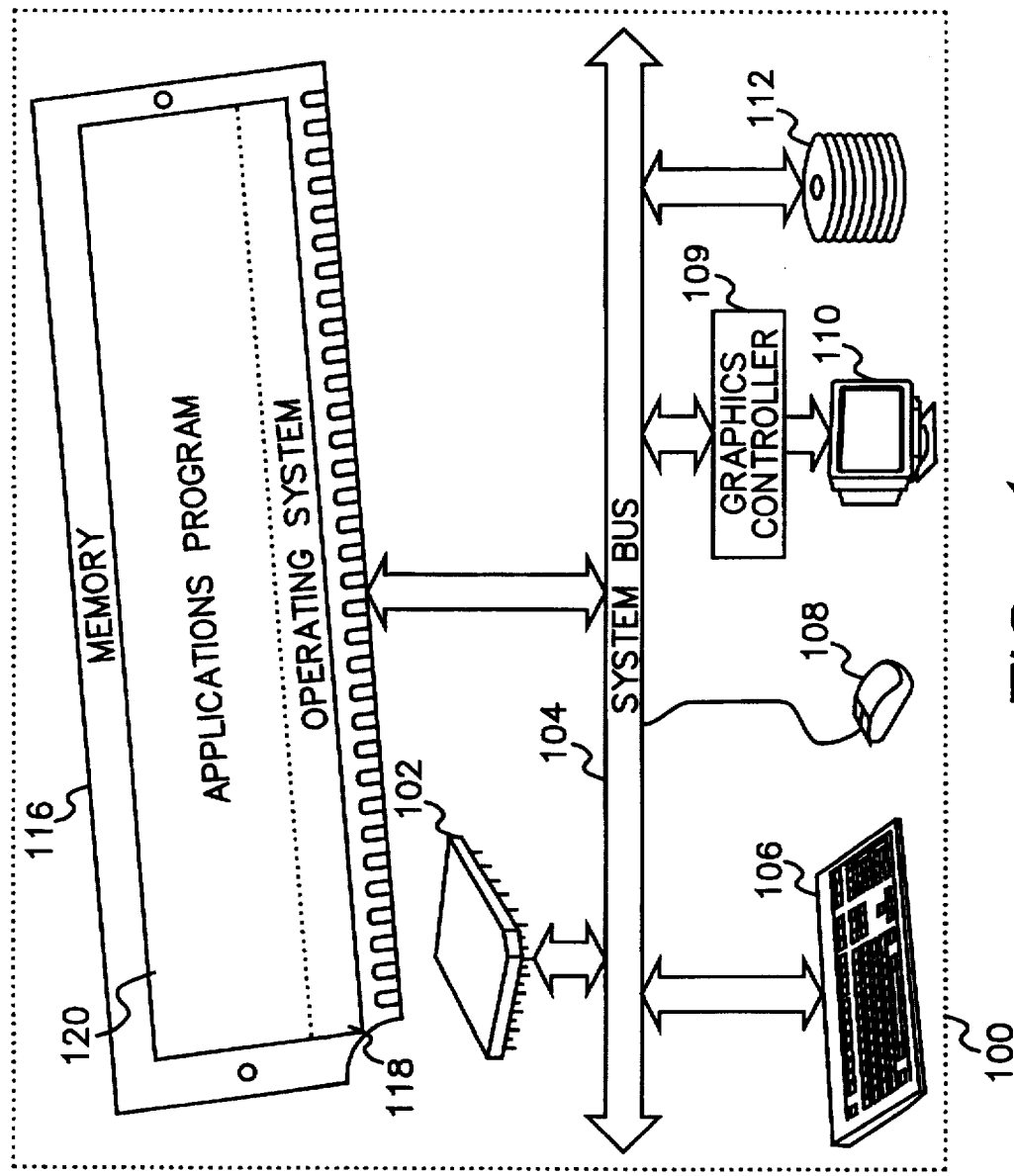
FIG. 1 shows a block diagram of a computer system, and illustrates the graphics controller containing the present invention.

FIG. 1 shows a block diagram of a computer system and illustrates the graphics controller containing the present invention. Referring now to FIG. 1, a computer system 100 contains a processing element 102 that communicates to other elements of the computer system 100 over a system bus 104. A keyboard 106 and a graphics locator device 108 provide input to the computer system 100 while a graphics controller 109 and display device 110 provide output from the computer system 100. The present invention is contained within the graphics controller 109.

A data storage device 112 typically stores data and software within the computer system 100, and a memory 116 typically contains an operating system 118, and an applications program 120 that utilize the services of the graphics controller 109.

Figure 2:
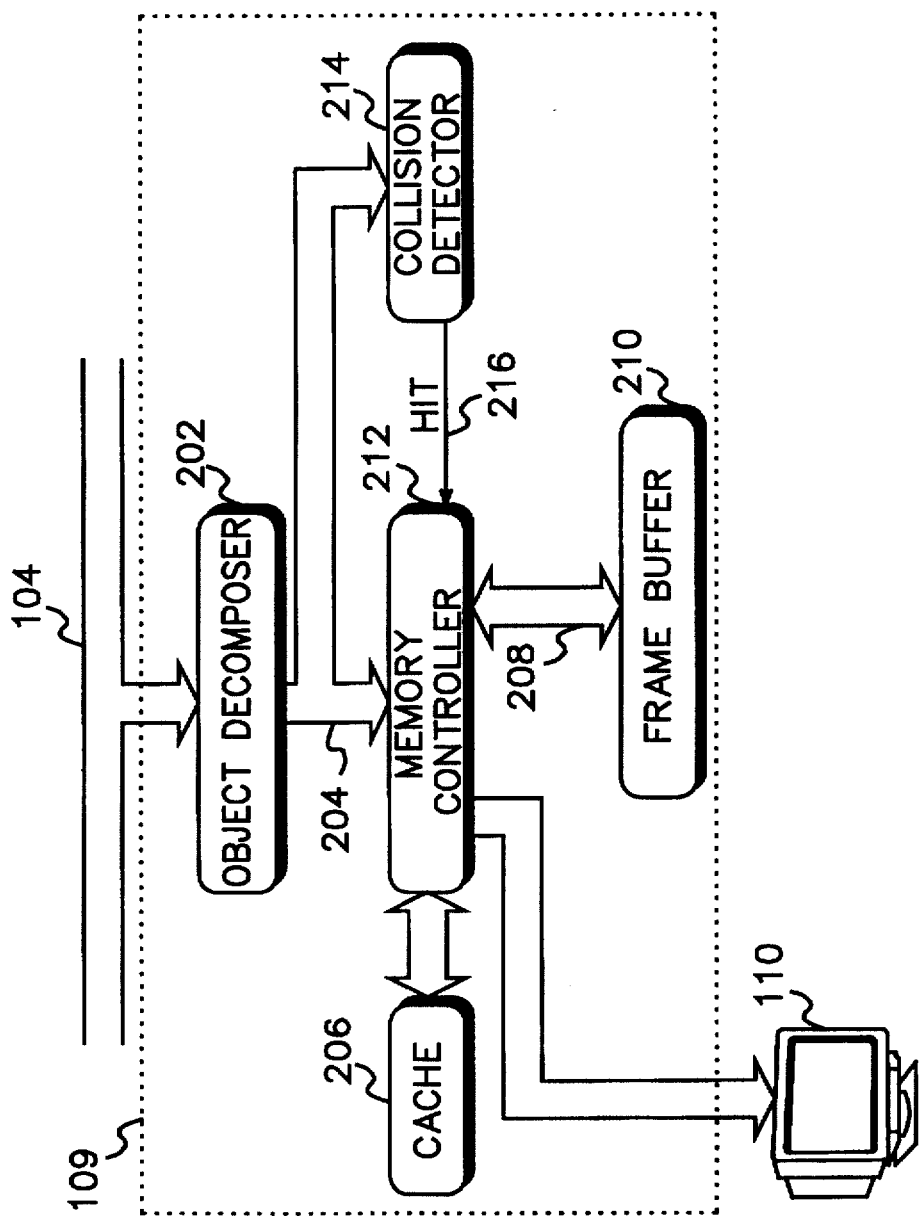
FIG. 2 shows a block diagram of the graphics controller of FIG. 1.

FIG. 2 shows a block diagram of part of the circuitry of the graphics controller 109. Referring now to FIG. 2, an object decomposer circuit 202 receives data and commands from the system bus 104 and decomposes these complex commands into the simpler operations that can be performed by the memory controller 212. These simpler operations involve many read-modify-write operations to a frame buffer memory 210. There is a turnaround time associated with the frame buffer memory 210, such that a read followed by a write takes longer than two successive reads or writes.

To achieve the highest performance when modifying the frame buffer memory 210, the memory controller 212 queues up as many of the simpler operations as possible. The memory controller 212 then issues a burst of read operations to retrieve the necessary data from the frame buffer memory 210, and stores this data in a cache 206. The memory controller 212 then modifies the data in the cache 206, and performs a burst of write operations to write the new data back to the frame buffer memory 210.

To achieve this performance, however, the memory controller 212 needs a collision detector circuit 214 to detect whether the address of data being retrieved from the frame buffer 210, to be placed in the cache 206, "collides" with the address of data already contained within the cache 206. This "collision" is indicated by the collision detector circuit 214 sending a hit signal 216 whenever a potential collision could occur. That is, the collision detector circuit 214, of the present invention, detects that either a collision has occurred, or that a collision is likely to occur.

Figure 3:
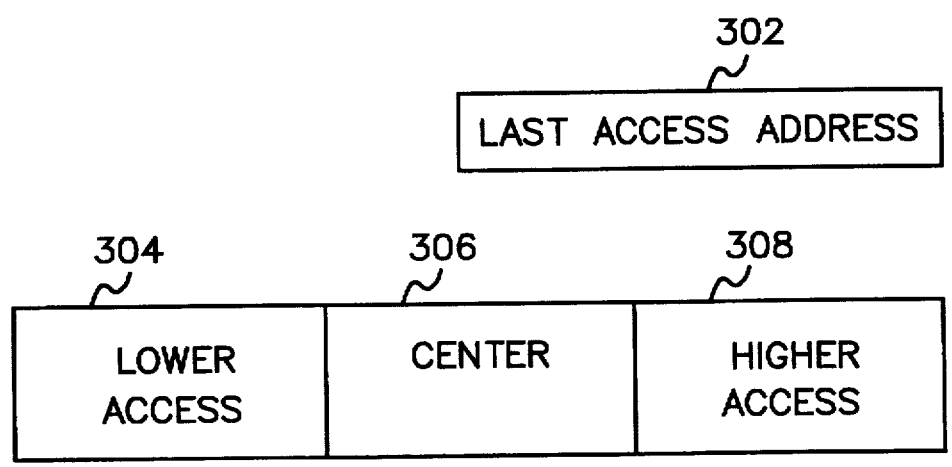
FIG. 3 shows a diagram illustrating the three state bits and one address register used in an alternative embodiment of the invention.

Although the preferred embodiment of the invention uses a two dimensional frame buffer memory, an alternative embodiment uses a one dimensional memory. In this alternative embodiment, the collision detector circuit 214 contains only three direction state bits and a last access register, as shown in FIG. 3. Referring to FIG. 3, last access address register 302 stores the address of the last memory access, and center state bit 306 indicates whether the last access address register 302 contains a valid address. Lower access direction state bit 304 indicates an access previously occurred having an address lower then the address contained in the last access address register 302, and higher access direction state bit 308 indicates an access previously occurred having an address higher then the address contained in the last access address register 302.

In this alternative embodiment, the controller starts with the last memory access register containing an arbitrary value and with all three state bits cleared. When the first memory access is received, the system detects that the state bits are all cleared and allows the memory access to occur, since no previous history exists within the state bits. The system then stores the address of this memory access in the last access address register 302, and also sets the center state bit 306 indicating that the last access address register 302 contains a valid value.

Since the center bit 306 is set, when another memory address, called the current access, is received, the system compares the address of the current access to the value in the last access address register 302. If they are equal, the system declares a hit. If they are not equal, the system determines whether the current access is lower than or higher than the value in the last access address register 302. For this example, assume the current access is higher than the value in the last access address register 302, so the system checks the higher access direction state bit 308, and since the higher access direction state bit 308 is not set, the access is allowed. After allowing the access, the system stores the memory address for the current access in the last access address register 302 and sets the lower access address state bit 304, indicating that an access occurred that had an address lower than the value now stored in the last access address register 302. The lower access state bit is set because the address of the current access is now stored in the last access address register 302 and the address that was stored there earlier, that is, before the current access occurred, was lower than the current access address.

When another memory address is received, the system compares this current access address to the value stored in the last access address register 302. If they are equal, of course, the system declares a hit. If they are not equal, the system then determines whether this access is lower than or higher than the value in the last access register 302. For this example, assume this access is higher than the value in the last access register 302, so the access is allowed because the higher access direction state bit 308 is not set. If, however, this access were lower than the value in the last access register 302, a hit would be declared since an earlier access had occurred that was also lower than the value in the last access address register 302.

As long as new memory accesses continue to be higher than the value in the last access register 302, the accesses will be allowed since no collision can possibly occur. When the first address is received that is equal to or lower than the last memory access, a hit will be declared since a potential collision could occur.

This system is conservative, and may indicate a hit where there really is none. For example, if an access occurs at address X, and then a second access occurs at address X+1, and then a third access occurs at address X−1, the system will indicate a collision. This is because the second access, at address X+1, is the last access address the system remembers, however, the system also remembers that there was at least one access to an address prior to address X+1, that is, the access to address X. When the address X−1 is received, the system flags a hit because X−1 is less than X+1. The system does not try to remember that X−1 is also less than X, thus no hit actually occurs—it is sufficient for the system to remember that any access less than X+1 causes a hit.

Figure 4:
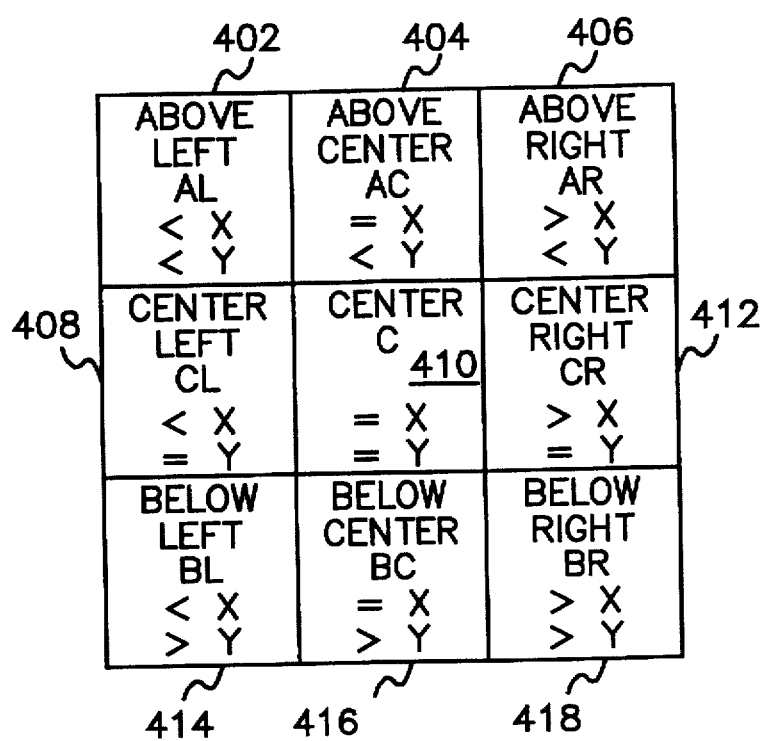
FIG. 4 shows a diagram illustrating the nine state bits used to indicate previous accesses in the preferred embodiment of the invention.

For the two dimensional frame buffer of the preferred embodiment, nine state bits are used. FIG. 4 shows a diagram illustrating the nine direction state bits used to indicate previous accesses. Referring to FIG. 4, the nine direction state bits comprise the center validity bit 410, which indicates whether the last access address register contains valid X and Y locations. Above center direction state bit 404 indicates that a previous access occurred directly above the last access address, that is, a previous access had a lower Y address but the same X address, as indicated by the symbols "=X" and "<Y" in box 404. Similarly, a center left direction state bit 408 indicates a previous access has occurred to the left, that is, a lower X position but the same Y position as the last memory access, as indicated by the symbols "<X" and "=Y" in box 408. A center right direction state bit 412 indicates that a previous access occurred to the right, that is, a greater X position but the same Y position as the last access, as indicated by the symbols ">X" and "=Y" in box 412. A below center direction state bit 416 indicates that a previous access has occurred below, that is with a greater Y position but the same X position as the last access, as indicated by the symbols "=X" and ">Y" in box 416.

Four additional direction state bits indicate whether previous accesses had occurred on a diagonal with respect to the last access. Above left direction state bit 402 indicates that a previous access occurred above and to the left, that is, a lower X position and a lower Y position than the last access, as indicated by the symbols "<X" and "<Y" in box 402. Similarly, above right direction state bit 406 indicates that a previous access occurred above and to the right of the last access, as indicated by the symbols ">X" and "<Y" in box 406. Below left direction state bit 414 indicates that a previous access occurred below and to the left of the last access, as indicated by the symbols "<X" and ">Y" in box 414, and below right direction state bit 418 indicates that a previous access occurred below and to the right of the last access, as indicated by the symbols ">X" and ">Y" in box 418.

The following example illustrates how the state bits shown in FIG. 4 are used by the collision detection circuit of the present invention. In this example, a rectangle is rastorized, or "painted", by processing its pixels left to right, top to bottom, to change each pixel. At the start of the example, all nine state bits are cleared, indicating no previous access history. This can occur either because the system has just received power, or that the cache was just flushed.

When the first memory access is received from the object decomposer 202, the collision detector system makes no comparison since the center bit 410 indicates that no previous access history is available. The system stores the address of this memory access in X and Y registers, and sets the center bit 410, indicating that a history of a last memory access exists.

The subsequent memory accesses proceed in a left to right, top to bottom fashion, since rectangles are typically painted in this manner. When another memory access is received, called the current access, the address of this access is to the right of the last memory access, that is, the X address location is one greater than the last memory access, and the Y address location is the same as the last memory access. When the collision detection system receives this current access address, it compares the X and Y portions of the address to the last memory access address, and the X comparison indicates "greater than" whereas the Y comparison indicates "equal". With these comparison results, the system will examine center right bit 412, which indicates the ">X" and "=Y" conditions, and determine that the center right position 412 is not set. Therefore, the system will allow the access.

After the access is performed, the system will update the state bits of FIG. 4 by setting the center left bit 408, thus indicating that an address previous to the now current access address was to the left of the now current access address; the system will store the address just received in the X and Y address registers; and the system will set the center bit 410 indicating that the X and Y registers are valid. Thus, after two accesses, the system knows that a previous access was "somewhere" to the left of the last access address stored in the X and Y address registers.

As the memory accesses move from left to right, the system remembers that there have been prior accesses "in line" to the left of the current position, as described above. After the last pixel of the first line of the rectangle has been painted, the object decomposer 202 (FIG. 2) will move down to the next line of the rectangle, and also move to the left most pixel of that next line. When the memory address for this first pixel of the next line is received, the system examines that address and determines that the access is below and to the left of the last access. Thus, the system will examine the below left bit 414 and find that this bit is not set, so the access will be allowed. After this access, the system will update the bits and set the above right bit, indicating that an access has occurred above and to the right of now current access address, specifically the last access. Since the previous state indicated that there had been accesses to the left of the last access address, the above center and above left bits are set to indicate a history of possible accesses in those areas. Although no access has actually occurred above and to the left of the last access, an access did occur left of the access prior to the last access, so the system will flag all accesses above and to the left as having been occurred.

That is, since some access has occurred to the left of the previous position, but the system does not know how far to the left, it will flag all accesses that were left of the previous position to now be above and to the left of the last access. The system direction state bits do indicate, however, that there have been no accesses in line to the left or in line to the right of the current memory access address, nor have there been any accesses below the current memory access address.

Now the rastorization continues left to right on the second line of the rectangle and the controller will flag no collisions. This continues to the bottom of the rectangle with no collisions being flagged as hits.

A second example illustrates when a hit can occur within the system of the present invention. This example shows the drawing of the outline of a rectangle, starting at the upper left corner and working around the periphery of the rectangle in a clockwise direction. For this example, assume the controller starts with all state bits reset. The first address is stored in the X and Y registers, and the center bit set indicating that there has been a previous access. As the accesses proceed left to right, the controller remembers that there are accesses in line to the left, but will flag no hits since all the new accesses are to the right of the last access.

At the end of the top line segment, the object decomposer begins accessing locations directly below the last pixel location on the top line. These are allowed because they are below the last access. The controller remembers that there are accesses in line above, and also remembers that there are accesses "somewhere" above and to the left. At the end of the right edge of the rectangle, the object decomposer begins stepping to the left, along the bottom of the rectangle. Now the controller remembers that there were accesses in line to the right and "somewhere" above. However, since there have been no accesses to the left of the bottom pixel on the right side of the rectangle, accesses moving to the left of the bottom pixel, that is, defining the bottom line of the rectangle, are allowed.

Finally, after the bottom segment of the rectangle is completed, the object decomposer begins accessing up the left side of the rectangle. When the first pixel starting upward on the left side of the rectangle is accessed, the collision detector will flag a hit, since it remembers that there have been some accesses up and to the left some time ago, which may be directly above the current "last" address.

At this point, the cache is flushed, and the direction state bits, and the X and Y address registers are cleared. The object decomposer then accesses the pixels moving up the left side of the rectangle. No hits will be flagged while processing the left side of the rectangle, since all new accesses after the cache flush are in line moving upward, with no possible collisions.

Figure 5:
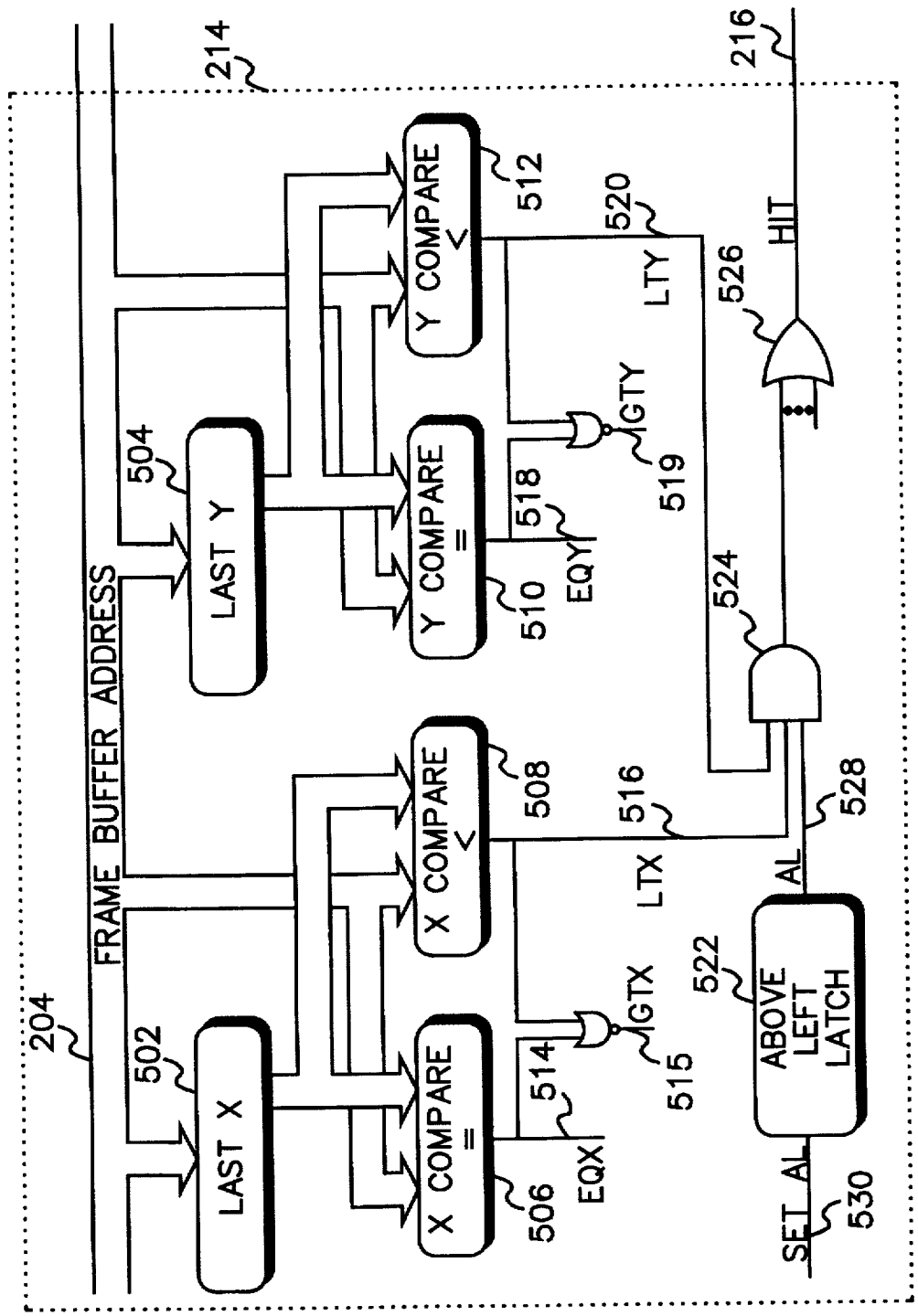
FIG. 5 shows a block diagram of part of the circuitry of the preferred embodiment collision detector circuit of FIG. 2.

FIG. 5 shows a block diagram of part of the circuitry of the preferred embodiment collision detector circuit of FIG. 2. Referring now to FIG. 5, frame buffer address bus 208 receives the address being sent from the object decomposer 202 (FIG. 2) to the frame buffer 210 (FIG. 2), through the memory controller 212. The "X" portion of the frame buffer address is routed to two comparators 506 and 508 which compare the X portion of the address to the last X address value stored in last X register 502. The outputs of the comparators 506 and 508 are the EQX signal 514 and LTX signal 516, and these signals are combined using a NOR gate to create GTX signal 515. These three signals indicate whether the X portion of the address on the frame buffer address bus 204 is equal to, less than, or greater than the last X address value stored in the last X register 502.

Similarly, the Y portion of the address on the frame buffer address bus 204 is gated to two comparators 510 and 512 which compare the Y portion of the frame buffer address to the last Y address value stored in last Y register 504. The EQY signal 518, output by the Y comparator 510, indicates that the Y portion of the frame buffer address is equal to the address value in the last Y register 504, and the LTY signal 520, output by Y comparator 512, indicates that the Y portion of the frame buffer address is less than the address value in the last Y register 504. The EQY signal 518 and the LTY signal 520 are combined with a NOR gate to create the GTY signal 519 which indicates that the incoming frame buffer address is greater than the last Y address value stored in last Y register 504.

These six signals, EQX 514, GTX 515, LTX 516, EQY 518, GTY 519, and LTY 520 provide the signals necessary to determine which of the state bits of FIG. 4 needs to be examined to determine whether the access will be allowed. The remaining circuitry shown in FIG. 5 is used to determine whether a hit has occurred when the incoming signal is less than X and less than Y.

Above left latch 522 stores the above left state bit 402 (FIG. 4). AND gate 524 combines the state value within the above left latch 522 with the LTX signal 516 and the LTY signal 520. If the X portion of the frame buffer address 204 is less than the last X value 502 then the LTX signal 516 will be a logical 1. Similarly, if the Y portion of the frame buffer address 204 is less than the last Y value 504 the LTY signal 520 will be a logical 1. The combination of these two will cause a hit if the above left latch 522 is set indicating that an access has previously occurred in the above left direction. Thus, if all three bits are a logical 1, the output of AND gate 524 will be a logical 1 which, when ORed with other bits from other comparisons by OR gate 526, will set the hit signal 216, indicating that the cache must be flushed before this new access will be allowed.

The circuits for the other eight state bits are identical to the above left latch 522 and AND gate 524, except, of course, they use different ones of the comparator output signals EQX 514, GTX 515, LTX 516, EQY 518, GTY 519, and LTY 520, as are shown in the direction state bit definitions of FIG. 4. OR gate 526 combines the output of all of the state comparisons, to produce the hit signal 216.

Each time an access occurs, all nine of the state bits shown in FIG. 4 must be updated. If the access is not allowed, the cache is flushed and all state bits are cleared. If the access is allowed, Table 1 shows the equations for updating each of the nine state bits, after each type of access that can occur. For example, the first entry in Table 1 shows the equations for updating the nine state bits after an access has occurred that is above and to the left of the previous access; the second entry shows the equations for updating the nine state bits after an access has occurred that is directly above the previous access; etc.

Table 2 shows the equation for updating the above left state bit. This equation is created by combining all of the updates to the above left state bit from Table 1. The entries for all the updates to the above left state bit from all the entries in Table 1 are combined using a logical OR function to create the equation of Table 2. The equations for the other eight state bits are created similarly by combining each of the entries for the particular state bit from Table 1 using a logical OR function. In the equations of Tables 1 and 2, the symbol "+" indicates a logical OR operation, and the symbol "●" indicates a logical AND operation. The symbol "<=" means "replaced by".

Figure 6:
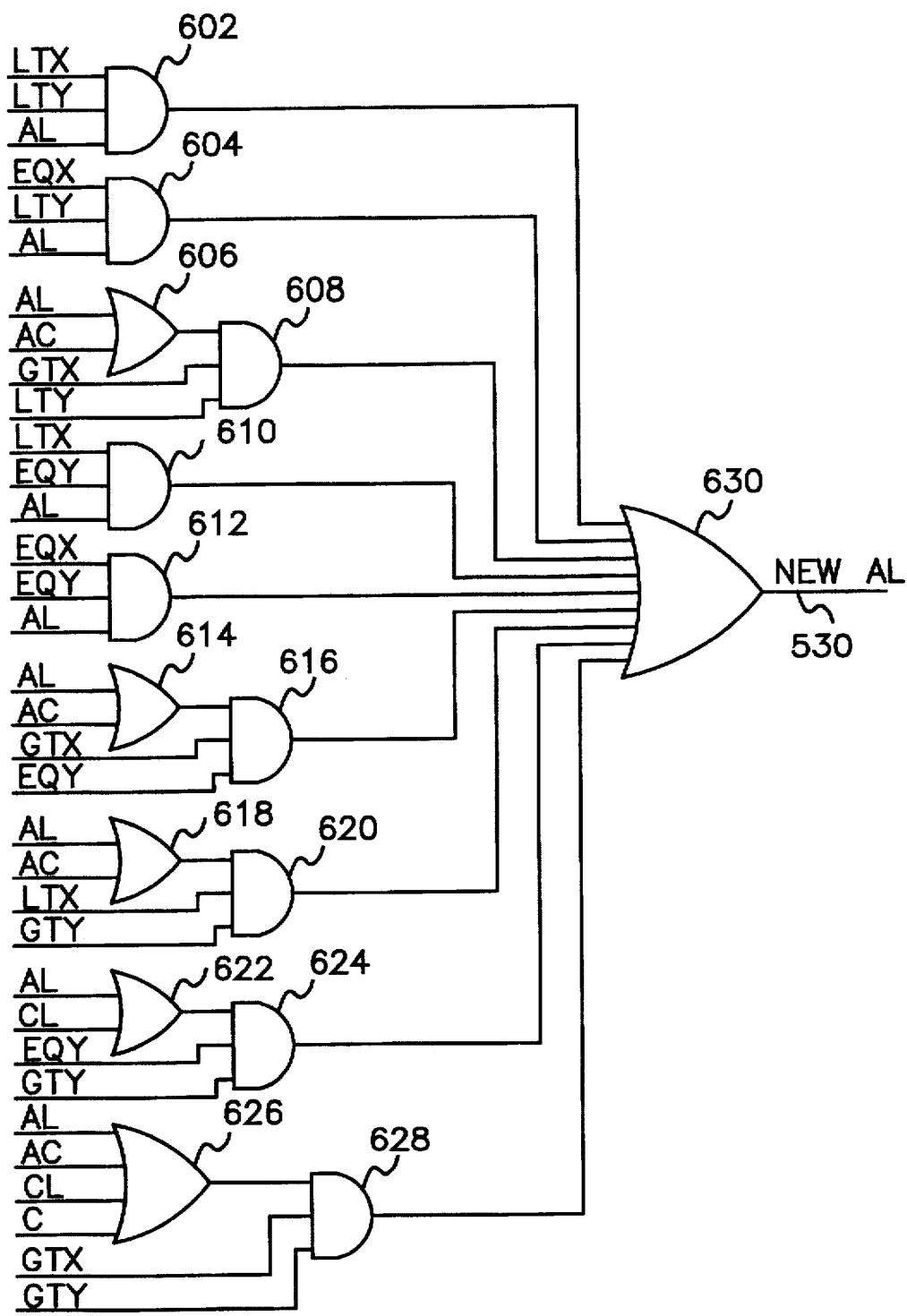
FIG. 6 shows a logic diagram of part of the circuitry of the preferred embodiment collision detector circuit of FIG. 2.

FIG. 6 shows a logic diagram of the equation of Table 2, which sets the upper left state bit. Those skilled in the art will recognize that similar logic diagrams could easily be created from combining the equations of Table 1 for the other eight state bits. Those skilled in the art will also recognize that the logic equation of Table 2 could be reduced using Boolean algebraic theorems to provide a smaller set of logic than that shown in FIG. 6.

Those skilled in the art will recognize that the invention can be expanded for use in a three-dimensional, or n-dimensional, memory. A three-dimensional implementation requires 27 bits of storage and a comparator for each of the three dimensions. An n-dimensional implementation requires $3^n$ bits of storage and a comparator for each of the n dimensions.

Having thus described a presently preferred embodiment of the present invention, it will be understood by those skilled in the art that many changes in construction and circuitry and widely differing embodiments and applications of the invention will suggest themselves without departing from the scope of the present invention as defined in the claims. The disclosures and the description herein are intended to be illustrative and are not in any sense limiting of the invention, defined in scope by the following claims.

TABLE 1

```
//New Access is above and left
    AL  <=  AL
    AC  <=  AL
    AR  <=  AC + AR
    CL  <=  AL
    C   <=  '1'
    CR  <=  AC + AR
    BL  <=  CL + BL
    BC  <=  CL + BL
    BR  <=  C + CR + BC + BR
//New Access is directly above
    AL  <=  AL
    AC  <=  AC
    AR  <=  AR
    CL  <=  AL
    C   <=  '1'
    CR  <=  AR
    BL  <=  BL + CL
    BC  <=  BC + C
    BR  <=  BR + CR
//New Access is above and right
    AL  <=  AL + AC
    AC  <=  AR
    AR  <=  AR
    CL  <=  AL + AC
    C   <=  '1'
    CR  <=  AR
    BL  <=  BL + CL + C + BC
    BC  <=  BR + CR
    BR  <=  BR + CR
//New Access is directly left
    AL  <=  AL
    AC  <=  AL
    AR  <=  AR + AC
    CL  <=  CL
    C   <=  '1'
    CR  <=  CR + C
    BL  <=  BL
    BC  <=  BL
    BR  <=  BR + BC
//New Access is the same as the last access
    AL  <=  AL
    AC  <=  AC
    AR  <=  AR
    CL  <=  CL
    C   <=  '1'
    CR  <=  CR
    BL  <=  BL
    BC  <=  BC
    BR  <=  BR
//New Access is directly right
    AL  <=  AL + AC
    AC  <=  AR
    AR  <=  AR
    CL  <=  CL + C
    C   <=  '1'
    CR  <=  CR
    BL  <=  BL + BC
    BC  <=  BR
    BR  <=  BR
//New Access is below and left
    AL  <=  AL + CL
    AC  <=  AL + CL
    AR  <=  AL + AR + C + CR
    CL  <=  BL
    C   <=  '1'
    CR  <=  BC + BR
    BL  <=  BL
    BC  <=  BL
    BR  <=  BC + BR
//New Access is directly below
    AL  <=  AL + CL
    AC  <=  AC + C
    AR  <=  AR + CR
    CL  <=  BL
    C   <=  '1'
    CR  <=  BR
    BL  <=  BL
    BC  <=  BC
```

TABLE 1-continued

```
    BR  <=  BR
//New Access is below and right
    AL  <=  AL + AC + CL + C
    AC  <=  AR + CR
    AR  <=  AR + CR
    CL  <=  BL + BC
    C   <=  '1'
    CR  <=  BR
    BL  <=  BL + BC
    BC  <=  BR
    BR  <=  BR
```

TABLE 2

```
AL <=  LTX ● LTY ● AL
     + EQX ●  LTY ● AL
     + GTX ●  LTY ● (AL + AC)
     + LTX ●  EQY ● AL
     + EQX ●  EQY ● AL
     + GTX ●  EQY ● (AL + AC)
     + LTX ●  GTY ● (AL + CL)
     + EQX ●  GTY ● (AL + CL)
     + GTX ●  GTY ● (AL + AC + CL + C)
```

What is claimed is:

1. A circuit for detecting address collisions between accesses to a memory, and for sending a hit signal when a collision is detected, the circuit comprising:

a last address register for retaining a last address received;

a first direction state bit for storing an indicator that previous memory accesses occurred in a first direction;

a comparator circuit for comparing a current memory address with the last address stored in the last address register, and for indicating the current memory address is located in the first direction from the last address stored in the last address register;

a hit detection circuit for detecting the collision and sending the hit signal when the comparator circuit indicates that the current memory address is located in the first direction from the last address stored in the last address register and the first direction state bit indicates that previous memory accesses have occurred in the first direction.

2. The circuit of claim 1 further comprising:

a second direction state bit for storing an indicator that previous memory accesses occurred in a second direction, opposite the first direction;

a second comparator circuit for comparing a current memory address with the last address stored in the last address register, and for indicating the current memory address is located in the second direction from the last address stored in the last address register;

a second hit detection circuit for detecting the collision and sending a second hit signal when the comparator circuit indicates that the current memory address is located in the second direction from the last address stored in the last address register and the second direction state bit indicates that previous memory accesses have occurred in the second direction.

3. The circuit of claim 2 further comprising a logical OR circuit for combining the hit signal and the second hit signal into a combined hit signal.

4. The circuit of claim 2 further comprising a state update circuit for setting the first direction state bit when the comparator circuit indicates that the current memory address is located in the second direction from the last address stored in the last address register and for setting the second direction state bit when the comparator circuit indicates that the current memory address is located in the first direction from the last address stored in the last address register.

5. The circuit of claim 2 further comprising a center state bit wherein the center state bit indicates presence of state information in the last address register, the first direction state bit and the second direction state bit.

6. The circuit of claim 5 further comprising:
a third comparator circuit for comparing a current memory address with the last address stored in the last address register, and for indicating the current memory address is equal to the last address stored in the last address register;
a third hit detection circuit for detecting the collision and sending a third hit signal when the comparator circuit indicates that the current memory address equal to the last address stored in the last address register.

7. A circuit for detecting address collisions between memory accesses in a memory organized as a two-dimensional array having an X address for a first of the two dimensions and having a Y address for a second of the two dimensions, and for sending a hit signal when a collision is detected, the circuit comprising:
a last X address register for storing a last address received;
a last Y address register for storing a last address received;
four direction state bits for storing indicators that previous memory accesses occurred in above, below, left, or right directions;
an X comparator circuit for comparing a current memory address with the last address stored in the last X address register, and for indicating that the current memory address is located in a left or a right direction from the last address stored in the last X address register;
a Y comparator circuit for comparing a current memory address with the last address stored in the last Y address register, and for indicating that the current memory address is located in an above or a below direction from the last address stored in the last Y address register;
a hit detection circuit for detecting the collision and sending the hit signal when the X comparator circuit and the Y comparator circuit indicate that the current memory address is located in the above, below, left, or right direction from the last address stored in the last X address register and the last address stored in the last Y address register and one of the direction state bits corresponding to the direction indicated by the X and Y comparator circuits indicates that previous memory accesses have occurred in the corresponding direction.

8. The circuit of claim 7 further comprising a center state bit wherein the center state bit indicates presence of state information in the last X address register and the last Y address register.

9. The circuit of claim 7 further comprising:
an above state update circuit for setting the one of the direction state bits that indicates that a previous memory access occurred in the above direction, when the Y comparator circuit indicates that the current memory address is located in the below direction from the last address stored in the last Y address register;
a below state update circuit for setting the one of the direction state bits that indicates that a previous memory access occurred in the below direction, when the Y comparator circuit indicates that the current memory address is located in the above direction from the last address stored in the last Y address register;

a left state update circuit for setting the one of the direction state bits that indicates that a previous memory access occurred in the left direction, when the X comparator circuit indicates that the current memory address is located in the right direction from the last address stored in the last X address register; and
a right state update circuit for setting the one of the direction state bits that indicates that a previous memory access occurred in the right direction when, the X comparator circuit indicates that the current memory address is located in the left direction from the last address stored in the last X address register.

10. The circuit of claim 7 further comprising:
four additional direction state bits for storing indicators that previous memory accesses occurred in above-left, below-left, above-right, and below-right directions;
a second hit detection circuit for detecting the collision and sending the hit signal when the X comparator circuit and the Y comparator circuit indicate that the current memory address is located in the above-left, below-left, above-right, or below-right direction from the last address stored in the last X address register and the last address stored in the last Y address register and one of the additional direction state bits corresponding to the direction indicated by the X and Y comparator circuits indicates that previous memory accesses have occurred in the corresponding direction.

11. The circuit of claim 10 further comprising:
an above-left state update circuit for setting the one of the direction state bits that indicates that a previous memory access occurred in the above-left direction, when the X comparator circuit and the Y comparator circuit indicate that the current memory address is located in the below-right direction from the last addresses stored in the last X register and the last Y address register;
a below-right state update circuit for setting the one of the direction state bits that indicates that a previous memory access occurred in the below-right direction, when the X comparator circuit and the Y comparator circuit indicate that the current memory address is located in the above-left direction from the last addresses stored in the last X address register and the last Y address register;
a below-left state update circuit for setting the one of the direction state bits that indicates that a previous memory access occurred in the below-left direction, when the X comparator circuit and the Y comparator circuit indicate that the current memory address is located in the above-right direction from the last addresses stored in the last X address register and the last Y address register; and
a above-right state update circuit for setting the one of the direction state bits that indicates that a previous memory access occurred in the above-right direction, when the X comparator circuit and the Y comparator circuit indicate that the current memory address is located in the below-left direction from the last addresses stored in the last X address register and the last Y address register.

12. A method for detecting address collisions between accesses to a memory, and for sending a hit signal when a collision is detected, the method comprising the steps of:
(a) retaining a last address received;
(b) storing a first direction indicator for indicating that previous memory accesses occurred in a first direction;

(c) comparing a current address received with the last address received, and indicating the current address received is located in the first direction from the last address received;

(d) detecting the collision and sending the hit signal when step (c) indicates that the current address received is located in the first direction from the last address received and the first direction indicator indicates that previous memory accesses have occurred in the first direction.

13. The method of claim 12 further comprising the steps of:

(e) storing a second indicator that previous memory accesses occurred in a second direction opposite the first direction;

(f) comparing the current address received with the last address received, and indicating the current address received is located in the second direction from the last address received;

(g) detecting the collision and sending a second hit signal when step (f) indicates that the current address received is located in the second direction from the last address received and the second direction indicator indicates that previous memory accesses have occurred in the second direction.

14. The method of claim 13 further comprising the step of:

(h) combining the hit signal and the second hit signal into a combined hit signal.

15. The method of claim 13 further comprising the step of:

(h) setting the first direction indicator when the comparing indicates that the current address received is located in the second direction from the last address received; and (i) setting the second direction indicator when the comparing indicates that the current address received is located in the first direction from the last address received.

16. The method of claim 12 further comprising the step of:

(e) storing a center indicator wherein the center indicator indicates that the last address received has been retained.

17. A method for detecting address collisions between memory accesses in a memory organized as a two-dimensional array having an X address for a first of the two dimensions and having a Y address for a second of the two dimensions, and for sending a hit signal when a collision is detected, the method comprising the steps of:

(a) retaining a last X address received;

(b) retaining a last Y address received;

(c) storing direction indicators to indicate that previous memory accesses occurred in above, below, left, or right directions;

(d) comparing a current address received with the last X address received, and indicating that the current address received is located in a left or a right direction from the last X address received;

(e) comparing the current address received with the last Y address received, and indicating that the current address received is located in an above or a below direction from the last address received;

(f) detecting the collision and sending the hit signal when the comparing of steps (d) and (e) indicate that the current address received is located in the above, below, left, or right direction from the last X address received and the last Y address received and one of the direction indicators that corresponds to the direction indicated by the steps (d) and (e) indicates that previous memory accesses have occurred in the corresponding direction.

18. The method of claim 17 further comprising the step of storing a center state direction indicator wherein the center state direction indicator indicates that a last X address received and a last Y address received have been retained.

19. The method of claim 17 further comprising the steps of:

(g) setting the one of the direction indicators that indicates that a previous memory access occurred in the left direction when step (d) indicates that the current address received is located in the right direction from the last X address received;

(h) setting the one of the direction indicators that indicates that a previous memory access occurred in the right direction when step (d) indicates that the current address received is located in the left direction from the last X address received;

(i) setting the one of the direction indicators that indicates that a previous memory access occurred in the above direction when step (e) indicates that the current memory address is located in the below direction from the last Y address received; and (j) setting the one of the direction indicators that indicates that a previous memory access occurred in the below direction when step (e) indicates that the current memory address is located in the above direction from the last Y address received.

20. The method of claim 17 further comprising the steps of:

(g) storing direction indicators to indicate that previous memory accesses occurred in above-left, below-left, above-right, and below-right directions;

(h) detecting the collision and sending the hit signal when step (d) and step (e) indicate that the current address received is located in the above-left, below-left, above-right, or below-right direction from the last X address received and the last Y address received and one of the direction indicators that corresponds to the direction indicated by steps (d) and (e) indicates that previous memory accesses have occurred in the corresponding direction.

21. The method of claim 20 further comprising the steps of:

(i) setting the one of the direction indicators that indicates that a previous memory access occurred in the above-left direction when step (d) and step (e) indicate that the current address received is located in the below-right direction from the last X address received and the last Y address received;

(j) setting the one of the direction indicators that indicates that a previous memory access occurred in the below-right direction when step (d) and step (e) indicate that the current address received is located in the above-left direction from the last X address received and the last Y address received;

(k) setting the one of the direction indicators that indicates that a previous memory access occurred in the below-left direction when step (d) and step (e) indicate that the current address received is located in the above-right direction from the last X address received and the last Y address received; and (l) setting the one of the direction indicators that indicates that a previous memory access occurred in the above-right direction when step (d) and step (e) indicate that the current address received is located in the below-left direction from the last X address received and the last Y address received.

* * * * *